United States Patent
George

(10) Patent No.: US 7,088,693 B2
(45) Date of Patent: Aug. 8, 2006

(54) ADAPTIVE DIVERSITY COMBINING FOR WIDE BAND CODE DIVISION MULTIPLE ACCESS (W-CDMA) BASED ON ITERATIVE CHANNEL ESTIMATION

(75) Inventor: Dileep George, Karnataka (IN)

(73) Assignee: Silicon Automation Systems Ltd., Bangalore (IN)

( * ) Notice: Subject to any disclaimer, the term of this patent is extended or adjusted under 35 U.S.C. 154(b) by 79 days.

(21) Appl. No.: 10/973,800

(22) Filed: Oct. 27, 2004

(65) Prior Publication Data

US 2005/0185701 A1    Aug. 25, 2005

Related U.S. Application Data

(63) Continuation of application No. 09/840,714, filed on Apr. 24, 2001, now abandoned.

(30) Foreign Application Priority Data

Apr. 27, 2000    (IN) .......................... 328/MAS/2000

(51) Int. Cl.
    *H04Q 7/00* (2006.01)
(52) U.S. Cl. ...................... 370/329; 370/477
(58) Field of Classification Search ............ None
    See application file for complete search history.

(56) References Cited

U.S. PATENT DOCUMENTS

| 5,710,758 | A  | * | 1/1998 | Soliman et al. ............ 370/241 |
| 6,321,073 | B1 | * | 11/2001 | Luz et al. ................ 455/239.1 |
| 6,369,757 | B1 | * | 4/2002 | Song et al. ................ 342/378 |
| 6,614,857 | B1 | * | 9/2003 | Buehrer et al. ............ 375/340 |
| 6,714,585 | B1 | * | 3/2004 | Wang et al. ............... 375/148 |
| 2003/0146870 | A1 | * | 8/2003 | Guo et al. .................. 342/383 |

* cited by examiner

*Primary Examiner*—Duc Ho
*Assistant Examiner*—Phuongchau Ba Nguyen
(74) *Attorney, Agent, or Firm*—Sidley Austin LLP

(57) ABSTRACT

The present invention provides a method for adaptive diversity combining for Wide Band Code Division Multiple Access (W-CDMA) comprising:
  splitting multi-path interference into $I_{known}$ and $I_{unknown}$ components,
  precomputing said $I_{known}$ interference components,
  iteratively estimating channel interference after removing $I_{known}$ components of the multi-path interference from the pilot symbols,
  using the convergence/divergence of the iteration as an indicator of the channel condition, and The instant invention also provides a system and configured computer program product for carrying out the above method.

18 Claims, 1 Drawing Sheet

ADAPTIVE DIVERSITY COMBINING FOR WIDE BAND CODE DIVISION MULTIPLE ACCESS (W-CDMA) BASED ON ITERATIVE CHANNEL ESTIMATION

This application is a continuation application of U.S. application Ser. No. 09/840,714, filed Apr. 24, 2001 now abandoned, the contents of which are incorporated by reference.

FIELD OF THE INVENTION

This invention relates to Adaptive Diversity Combining for Wide Band Code Division Multiple Access (W-CDMA) based on Iterative Channel Estimation.

BACKGROUND OF THE INVENTION

Maximal Ratio Combining (MRC) is a technique used to combine the different multipath components from the fingers of a Rake Receiver in CDMA systems. In ideal conditions, MRC is known to provide better Signal to Interference Ratio (SIR) than Equal Gain Combining (EGC) which is another well understood combining technique.

However, MRC requires estimation of the channel impulse response. When the channel estimates are not reliable, as could happen in severe channel conditions, the performance of MRC degrades. With non-ideal channel estimates the performance of MRC can degrade below that of EGC. This is because EGC does not use any channel estimates for combining the paths and therefore its performance is independent of the channel conditions.

Channel Estimation is done on pilot symbols. In the downlink of W-CDMA, the only source of interference is the multipath interference. The pilot symbols are degraded by multipath interference. The level of degradation will depend on the level of multipath interference. Hence the reliability of the channel estimates too will depend on the level of multipath interference. Therefore for more reliable channel estimates to be obtained, the effect of multipath interference on the pilot symbols has to be removed.

It follows that a better receiver would be the one, which chooses its combining technique based on the channel conditions. The problem of the performance degradation of MRC due to non-ideal channel estimates has not been addressed so far.

THE OBJECT AND SUMMARY OF THE INVENTION

The object of this invention is to obviate this drawback.

To achieve the said objective, this invention provides a method for adaptive diversity combining for Wide Band Code Division Multiple Access (W-CDMA) comprising:
 splitting multi-path interference into $I_{known}$ and $I_{unknown}$ components,
 precomputing said $I_{known}$ interference components,
 iteratively estimating channel interference after removing $I_{known}$ components of the multi-path interference from the pilot symbols,
 using the convergence/divergence of the iteration as an indicator of the channel condition, and
 selecting the combining technique (MRC or EGC) automatically depending on the channel condition.

EGC is selected if said iteration diverges and MRC is selected if it converges.

The precomputation of said $I_{known}$ interference components is calculated by the following formulae $$c_l = \frac{d_l - \sum c_m I_{known} - I_{unknown}}{S_{l,l}}$$

where,
 $c_l$=refined channel estimate of lth finger
 $d_l$=de-spread data of lth finger
 $c_m$=channel estimate of mth path
 $S_{ll}$=signal component that will be received if no path other than path l is present The refined channel estimates cin are obtained using the following iteration $$c_l^{(n)} = d_l(j) - \Sigma c_m^{(n-1)} I_{known}$$

where
 $c_l^{(n)}$=nth iterative value of channel estimate
 $d_l(j)$=jth de-spread data of lth finger
 $c_m^{(n-1)}$=(n−1)th refined channel estimate of mth path The said convergence of the iteration is monitored using the following formula $$\delta = |c_l^{(n)} - c_l^{(n-1)}|$$

where
 $\delta$=convergence measurement parameter
 $c_l^{(n)}$=nth iterative value of channel estimate
 $c_m^{(n-1)}$=(n−1)th refined channel estimate of mth An increasing value of convergence measurement parameter indicates a diverging iteration while a reducing value of convergence measurement parameter indicates a converging iteration and the iteration is stopped when the following condition is satisfied wherein $\delta_{th}$ is fixed depending on the degree of refinement required for the channel estimates $$\delta < \delta_{th}$$

where,
 $\delta$=convergence of iteration
 $\delta_{th}$=predefined threshold value of refinement required for channel estimate The instant invention also provides a system for adaptive diversity combining for Wide Band Code Division Multiple Access (W-CDMA) comprising:
 means for splitting multi-path interference into $I_{known}$ and $I_{unknown}$ components,
 means for precomputing said $I_{known}$ interference components,
 means for iteratively estimating interference after removing $I_{known}$ components of the multi-path interference from the pilot symbols,
 means for monitoring the convergence/divergence of the iteration as an indicator of the channel condition, and
 means for selecting the combining technique (MRC or EGC) automatically depending on the channel condition.

The said means for selecting chooses EGC if said iteration diverges and MRC if said iteration converges.

The means for precomputation of said $I_{known}$ interference components uses following formulae $$c_l = \frac{d_l - \sum c_m I_{known} - I_{unknown}}{S_{l,l}}$$

where,
- $c_l$=refined channel estimate of lth finger
- $d_L$=de-spread data of lth finger
- $c_m$=channel estimate of mth path
- $S_{ll}$=signal component that will be received if no path other than path l is present The said means for iterative estimation uses:

$$c_l^{(n)} = d_l(j) - \Sigma c_m^{(n-1)} I_{known}$$

where
- $c_l^{(n)}$=nth iterative value of channel estimate
- $d_l(j)$=jth de-spread data of lth finger
- $c_m^{(n-1)}$=(n−1)th refined channel estimate of mth path The said means for monitoring uses:

$$\delta = |c_l^{(n)} - c_l^{(n-1)}|$$

where
- =convergence of iteration
- $c_l^{(n)}$=nth iterative value of channel estimate
- $c_m^{(n-1)}$=(n−1)th refined channel estimate of mth The said means for monitoring uses an increasing value of convergence measurement parameter to indicate a diverging iteration and a reducing value of convergence measurement parameter to indicate a converging iteration and the iteration is stopped when the following condition is satisfied wherein $\delta_{th}$ is fixed depending on the degree of refinement required for the channel estimates $$\delta < \delta_{th}$$

where,
- δ=convergence of iteration
- $\delta_{th}$=predefined threshold value of refinement required for channel estimate The invention further provides a computer program product comprising computer readable program code stored on computer readable storage medium embodied therein for adaptive diversity combining for Wide Band Code Division Multiple Access (W-CDMA) comprising:
- computer readable program code means configured for splitting multi-path interference into $I_{known}$ and $I_{unknown}$ components,
- computer readable program code means configured for precomputing said $I_{known}$ interference components,
- computer readable program code means configured for iteratively estimating interference after removing $I_{known}$ components of the multi-path interference from the pilot symbols,
- computer readable program code means configured for monitoring the convergence/divergence of the iteration as an indicator of the channel condition, and
- computer readable program code means configured for selecting the combining technique (MRC or EGC) automatically depending on the channel condition.

The said computer readable program code means configured for selecting chooses EGC if said iteration diverges and MRC if said iteration converges.

The computer readable program code means configured for precomputation of said $I_{known}$ interference components uses following formulae $$c_l = \frac{d_l - \sum c_m I_{known} - I_{unknown}}{S_{l,l}}$$

where,
- $c_l$=refined channel estimate of lth finger
- $d_l$=de-spread data of lth finger
- $c_m$=channel estimate of mth path
- $S_{ll}$=signal component that will be received if no path other than path l is present The said computer readable program code means configured for iterative estimation uses:

$$c_l^{(n)} = d_l(j) - \Sigma c_m^{(n-1)} I_{known}$$

where
- $c_l^{(n)}$=nth iterative value of channel estimate
- $d_l(j)$=jth de-spread data of lth finger
- $c_m^{(n-1)}$=(n−1)th refined channel estimate of mth path The said computer readable program code means configured for monitoring uses:

$$\delta = |c_l^{(n)} - c_l^{(n-1)}|$$

where
- =convergence of iteration
- $c_l^{(n)}$=nth iterative value of channel estimate
- $c_m^{(n-1)}$=(n−1)th refined channel estimate of mth The said computer readable program code means configured for monitoring uses an increasing value of convergence measurement parameter to indicate a diverging iteration and a reducing value of convergence measurement parameter to indicate a converging iteration and the iteration is stopped when the following condition is satisfied wherein $\delta_{th}$ is fixed depending on the degree of refinement required for the channel estimates $$\delta < \delta_{th}$$

where,
- δ=convergence of iteration
- $\delta_{th}$=predefined threshold value of refinement required for channel estimate.

DETAILED DESCRIPTION OF THE DRAWINGS

Figure 1:
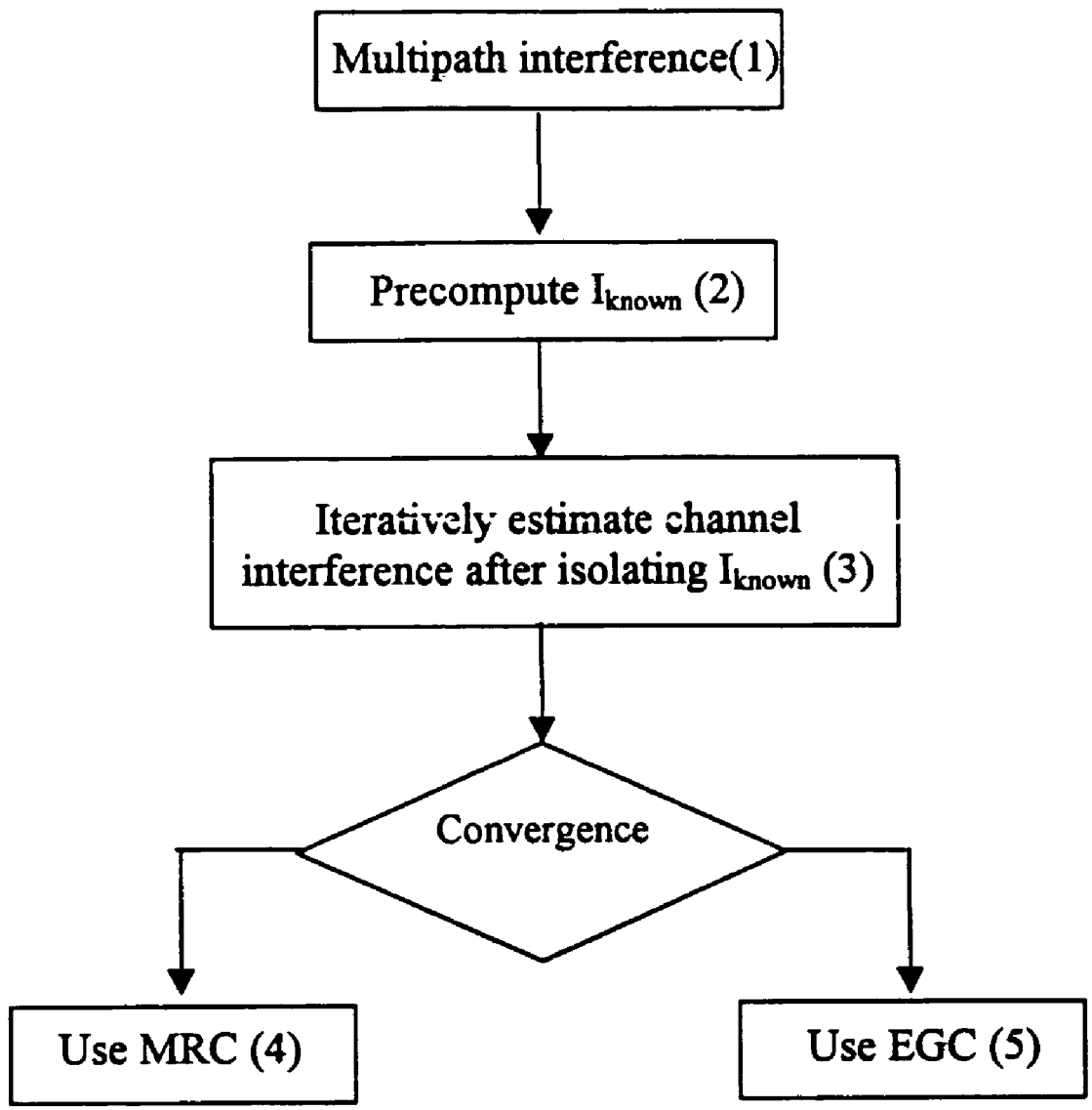
FIG. 1 shows the flow diagram for adaptive diversity combining for wide band code division multiple access (W-CDMA) according to this invention.

Referring to drawings, FIG. 1 illustrates adaptive diversity combining for Wide Band Code Division Multiple Access (W-CDMA) comprising precomputing (2) $I_{known}$ component of the multipath interference followed by iterative estimation of channel interference (3) after isolating said $I_{known}$ components from the pilot symbols. EGC is selected (4) if said iteration diverges and MRC is selected (5) if it converges (6).

The $j^{th}$ de-spread data from the $l^{th}$ finger of a Rake receiver in a DS-CDMA system can be expressed as $$d_l(j) = \sum_{j^*L_1}^{(j+1)^*L_1-1} u(K_1)g(K_2)\left(\sum c_m s(k-\tau_m)\right)$$

where, u is scrambling code, g is the spreading code $c_m$s the channel coefficients, $\tau_m$s are the channel tap delays and s is the transmitted chirp. The channel is modelled as a tapped delay line. $L_1$ is the period of the walsh spreading code that is used and j is equal to the integral value of $k/L_1$, $K_1$ and $K_2$ are such that $K_1$=mod($k,L_1$) and $K_2$=mod($k,L_2$) where mod represents the modulo operator and $L_2$ is the period of the scrambling code that is used. The noise component is neglected.

Let $S_{l,l} = \sum_{j^*L_1}^{(j+1)^*L_1-1} u(K_1)g(K_2)s(k-\tau_l)$ and $I_{l,m(\neq l)} = \sum_{j^*L_1}^{(j+1)^*L_1-1} u(K_1)g(K_2)s(k-\tau_m)$ Then $d_l(j) = c_l S_{l,l}(j) + \sum_{l \neq m} c_m I_{l,m}$ $S_{l,l}$ is the signal component that will be received if no path other than path l is present.

$I_{l,m}$ is the interference on path l due to the existence of path m. Hence the actual received signal when a particular path component is de-spread can be expressed as the sum of signal from own path and the interference components from all other paths.

In the above equations $\tau_m$ denotes the delay produced by path m. These delay values are known from the output of a multipath searcher. With $\tau_1 \ldots \tau_N$ being known, the only unknown term in these equations is the transmitted chirp s. It follows that if a continuous stream of pilot bits is transmitted, then the receiver will have knowledge of s and hence $S_{l,l}$ and $I_{l,m(\neq l)}$ can be calculated for all l and all m≠l.

If the only channel in the downlink is a pilot stream and if the path profile is entirely known and if the noise component is neglected, the ideal channel estimation problem becomes the problem of solving a system of simultaneous equations as shown below.

$$\begin{bmatrix} d_1(j) \\ d_2(j) \\ \vdots \\ d_N(j) \end{bmatrix} = \begin{bmatrix} S_{1,1}(j) & I_{1,2}(j) & \cdots & I_{1,N}(j) \\ I_{2,1}(j) & S_{2,2}(j) & \cdots & I_{2,N}(j) \\ \vdots & \vdots & \vdots & \vdots \\ I_{N,1}(j) & \cdots & \cdots & S_{N,N}(j) \end{bmatrix} \cdot \begin{bmatrix} c_1(j) \\ c_2(j) \\ \vdots \\ c_N(j) \end{bmatrix}$$

Hence for this case the channel coefficients can be determined exactly by solving the above system of equations.

In the actual scenario, a multitude of channels exist simultaneously in the downlink, carrying the data for multiple users. For multiple channels in the downlink the above analysis has to be modified. For this case, the interference component is split into two, namely, $I_{known}$ and $I_{unknown}$. $I_{known}$ consists of all interference components that can be calculated at the mobile receiver with the knowledge of the multipath profile. This will include the self-interference due to same spreading code from other paths. It can also include the other channels in the downlink of which the mobile receiver has information, for example the auxiliary pilot channels. For each path, these components are clubbed under $I_{knownn}$.

The multipath interference components caused by other users' spreading codes cannot be calculated by the mobile receiver as the spreading and scrambling codes are unknown. Also, if the number of paths detected by the searcher is less than the number of taps of the channel, the interference caused by the extra paths cannot be determined at the UE. Noise can also be considered as producing a form of interference. All these components are clubbed under $I_{unknown}$ for all the paths. With this we have, $$d_l(j) = c_l S_{l,l}(j) + \sum_{l \neq m} c_m I_{l,m(known)} + I_{l,m(unknown)}$$

The entire unknown interference on path l from path m, including the noise effect, is clubbed under the term $I_{l,m(unknown)}$.

Iterative Channel Estimation

From the above equations, $$c_l = \frac{d_l - \sum c_m I_{known} - I_{unknown}}{S_{l,l}}$$

$I_{known}$ are pre-computed once the path-profile is known. The initial values of $c_l$ for all l are obtained by $c_l^{(0)} = d_l(j)/S_{l,l}(j)$ Refined estimates $c_l^{(n)}$ are obtained using the following iteration;

$c_l^{(n)} = d_l(j) - \Sigma c_m^{(n-1)} I_{known}$

Convergence of the iteration is monitored using the term $\delta = |c_l^{(n)} - c_l^{(n-1)}|$ If $\delta$ is increasing after a few iterations, then the iteration diverges. If $\delta$ is decreasing, the iteration converges. A converging iteration is stopped when the condition $\delta < \delta_{th}$ is met. $\delta_{th}$ is fixed depending on the degree of refinement required for the channel estimates.

Convergence of the above iteration depends on the magnitude of $I_{unknown}$ relative to $I_{known}$. For small and intermediate values of $I_{unknown}$ the iteration converges while for large values of $I_{unknown}$ the iteration diverges.

The adaptive combining technique is derived from the observations made in the above two sections. These observations are listed below When interference is high the channel estimates are bad and hence performance of MRC becomes worse than that of EGC When unknown interference is high the channel estimates cannot be refined and the iterative estimation diverges.

From the above, it can be observed that if the iteration diverges then it is also likely that the MRC performance is degraded because of bad channel estimates. From these an iterative algorithm is obtained which is shown below. This algorithm selects the diversity combining technique depending on the channel conditions. If the channel is bad and the interference is high then it selects EGC. When the interference is low and the channel estimates are reliable, it selects MRC as the combining technique.

The invention claimed is:

1. A method for adaptive diversity combining for Wide Band Code Division Multiple Access (W-CDMA) comprising:
splitting multi-path interference into $I_{known}$ and $I_{unknown}$ components,
precomputing said $I_{known}$ interference components,
iteratively estimating channel interference after removing $I_{known}$ components of the multi-path interference from the pilot symbols,
using the convergence/divergence of the iteration as an indicator of the channel condition, and
selecting the combining technique (MRC-Maximal Ratio Combining or EGO-Equal Gain Combining) automatically depending on the channel condition.

2. The method as claimed in claim 1 wherein EGC is selected if said iteration diverges and MRC is selected if it converges.

3. A method as claimed in claim 1 wherein precomputation of said $I_{known}$ interference components is calculated by the following formulae $$c_l = \frac{d_l - \sum c_m I_{known} - I_{unknown}}{S_{l,l}}$$

where,
$c_l$=refined channel estimate of lth finger
$d_l$=de-spread data of lth finger
$c_m$=channel estimate of mth path
$S_{l,l}$=signal component that will be received if no path other than path l is present.

4. A method as claimed in claim 1 wherein refined channel estimates $c_l^n$ are obtained using the following iteration $$c_l^{(n)} = d_l(j) - \Sigma c_m^{(n-1)} I_{known}$$

where
$c_l^{(n)}$=nth iterative value of channel estimate
$d_l(j)$=jth de-spread data of lth finger
$C_m^{(n-1)}$=(n−1)th refined channel estimate of mth path.

5. A method as claimed in claim 1 wherein said convergence of the iteration is monitored using the following formula $$\delta = |c_l^{(n)} - c_l^{(n-1)}|$$

where
$\delta$=convergence measurement parameter
$c_l^{(n)}$=nth iterative value of channel estimate
$c_m^{(n-1)}$=(n−1)th refined channel estimate of mth.

6. The method as claimed in claim 1 wherein an increasing value of convergence measurement parameter indicates a diverging iteration while a reducing value of convergence measurement parameter indicates a converging iteration and the iteration is stopped when the following condition is satisfied wherein $\delta_{th}$ is fixed depending on the degree of refinement required for the channel estimates $$\delta < \delta_{th}$$

where,
$\delta$=convergence of iteration
$\delta_{th}$=predefined threshold value of refinement required for channel estimate.

7. A system for adaptive diversity combining for Wide Band Code Division Multiple Access (W-CDMA) comprising:
means for splitting multi-path interference into $I_{known}$ and $I_{unknown}$ components,
means for precomputing said $I_{known}$ interference components,
means for iteratively estimating interference after removing $I_{known}$ components of the multi-path interference from the pilot symbols,
means for monitoring the convergence/divergence of the iteration as an indicator of the channel condition, and
means for selecting the combining technique (MRC-Maximal Ratio Combining or EGO-Equal Gain Combining) automatically depending on the channel condition.

8. The system as claimed in claim 7 wherein said means for selecting chooses EGC if said iteration diverges and MRC if said iteration converges.

9. A system as claimed in claim 7 wherein means for precomputation of said l interference components uses following formulae $$c_l = \frac{d_l - \sum c_m I_{known} - I_{unknown}}{S_{l,l}}$$

where,
$c_l$=refined channel estimate of lth finger
$d_l$=de-spread data of lth finger
$c_m$=channel estimate of mth path
$S_{l,l}$=signal component that will be received if no path other than path l is present.

10. A system as claimed in claim 7 wherein said means for iterative estimation uses:

$$c_l^{(n)} = d_l(j) - \Sigma c_m^{(n-1)} I_{known}$$

where
$c_l$=nth iterative value of channel estimate
$d_l(j)$=jth de-spread data of lth finger
$c_m^{(n-1)}$=(n−1)th refined channel estimate of mth path.

11. A system as claimed in claim 7 wherein said means for monitoring uses:

$$\delta = |c_l^{(n)} - c_l^{(n-1)}|$$

where
=convergence of iteration
$c_l^{(n)}$=nth iterative value of channel estimate
$c_m^{(n-1)}$=(n−1)th refined channel estimate of mth.

12. The system as claimed in claim 7 wherein said means for monitoring uses an increasing value of convergence measurement parameter to indicate a diverging iteration and a reducing value of convergence measurement parameter to indicate a converging iteration and the iteration is stopped when the following condition is satisfied wherein $\delta_{th}$ is fixed depending on the degree of refinement required for the channel estimates $$\delta < \delta_{th}$$

where,
$\delta$=convergence of iteration
$\delta_{th}$=predefined threshold value of refinement required for channel estimate.

13. A computer program product comprising computer readable program code stored on computer readable storage medium embodied therein for adaptive diversity combining for Wide Band Code Division Multiple Access (W-CDMA) comprising:

computer readable program code means configured for splitting multi-path interference into $I_{known}$ and $I_{unknown}$ components, computer readable program code means configured for precomputing said $I_{known}$ interference components, computer readable program code means configured for iteratively estimating interference after removing $I_{known}$ components of the multi-path interference from the pilot symbols, computer readable program code means configured for monitoring the convergence/divergence of the iteration as an indicator of the channel condition, and computer readable program code means configured for selecting the combining technique (MRC-Maximal Ratio Combining or EGO-Equal Gain Combining) automatically depending on the channel condition.

14. The computer program product as claimed in claim 13 wherein said computer readable program code means configured for selecting chooses EGC if said iteration diverges and MRC if said iteration converges.

15. The computer program product as claimed in claim 13 wherein computer readable program code means configured for precomputation of said $I_{known}$ interference components uses following formulae $$c_l = \frac{d_l - \sum c_m I_{known} - I_{unknown}}{S_{l,l}}$$

where,
$c_l$=refined channel estimate of lth finger
$d_l$=de-spread data of lth finger
$c_m$=channel estimate of mth path
$S_{l,l}$=signal component that will be received if no path other than path l is present.

16. The computer program product as claimed in claim 13 wherein said computer readable program code means configured for iterative estimation uses:

$$c_l^{(n)} = d_l(j) - \Sigma c_m^{(n-1)} I_{known}$$

where
$c_l^{(n)}$=nth iterative value of channel estimate
$d_l(j)$=jth de-spread data of lth finger
$c_m^{(n-1)}$=(n−1)th refined channel estimate of mth path.

17. The computer program product as claimed in claim 13 wherein said computer readable program code means configured for monitoring uses:

$$\delta = |c_l^{(n)} - c_l^{(n-1)}|$$

where
=convergence of iteration
$c_l^{(n)}$=nth iterative value of channel estimate
$c_m^{(n-1)}$=(n−1)th refined channel estimate of mth.

18. The computer program product as claimed in claim 13 wherein said computer readable program code means configured for monitoring uses an increasing value of convergence measurement parameter to indicate a diverging iteration and a reducing value of convergence measurement parameter to indicate a converging iteration and the iteration is stopped when the following condition is satisfied wherein $\delta_{th}$ is fixed depending on the degree of refinement required for the channel estimates $$\delta < \delta th$$

where,
$\delta$=convergence of iteration
$\lambda_{th}$=predefined threshold value of refinement required for channel estimate.

* * * * *